July 10, 1962  F. PAPKE  3,043,180
CAMERA WITH BUILT-IN BLOCK TYPE ALBADA VIEWFINDER AND
INTEGRATED OPTICAL MEANS FOR VIEWING
A MEASURING INSTRUMENT POINTER
Filed Jan. 26, 1961  4 Sheets-Sheet 1

INVENTOR
FRIEDRICH PAPKE
BY Blum, Moscovitz,
Friedman & Blum

ATTORNEYS

July 10, 1962 F. PAPKE 3,043,180
CAMERA WITH BUILT-IN BLOCK TYPE ALBADA VIEWFINDER AND
INTEGRATED OPTICAL MEANS FOR VIEWING
A MEASURING INSTRUMENT POINTER
Filed Jan. 26, 1961 4 Sheets-Sheet 2

INVENTOR
FRIEDRICH PAPKE
BY Blum, Moscovitz,
Friedman & Blum

ATTORNEYS

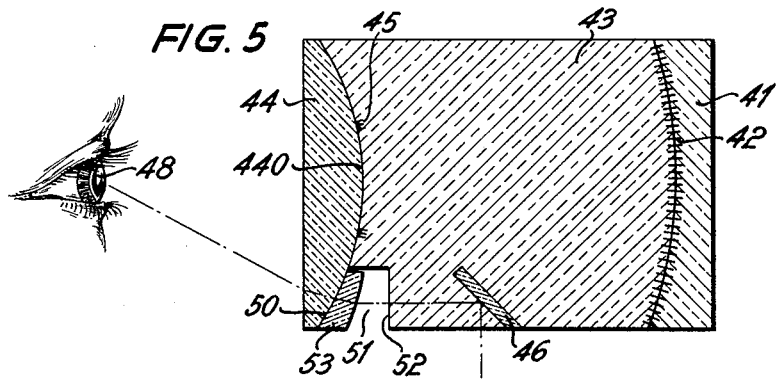
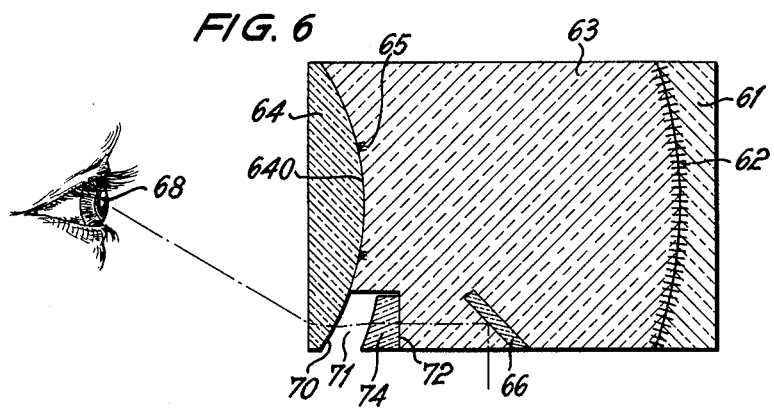
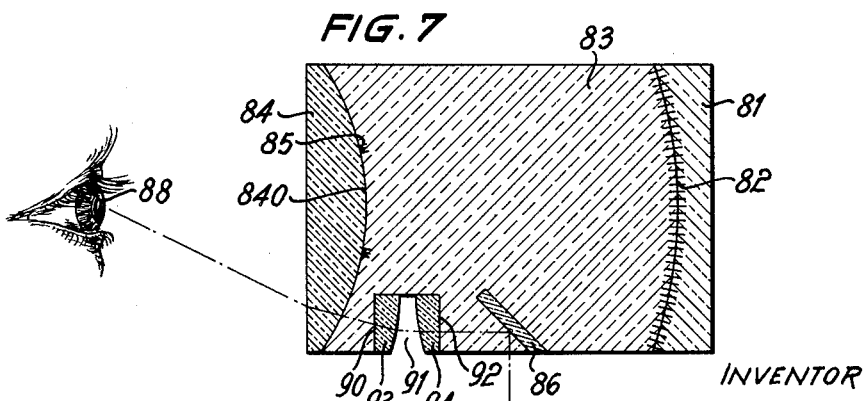

July 10, 1962 F. PAPKE 3,043,180
CAMERA WITH BUILT-IN BLOCK TYPE ALBADA VIEWFINDER AND
INTEGRATED OPTICAL MEANS FOR VIEWING
A MEASURING INSTRUMENT POINTER
Filed Jan. 26, 1961 4 Sheets-Sheet 4

INVENTOR
FRIEDRICH PAPKE
BY Blum, Moscovitz,
Friedman & Blum
ATTORNEYS

United States Patent Office 3,043,180
Patented July 10, 1962

3,043,180
CAMERA WITH BUILT-IN BLOCK TYPE ALBADA VIEWFINDER AND INTEGRATED OPTICAL MEANS FOR VIEWING A MEASURING INSTRUMENT POINTER
Friedrich Papke, Braunschweig, Germany, assignor to Voigtlander A.G., Braunschweig, Germany, a corporation of Germany
Filed Jan. 26, 1961, Ser. No. 85,093
Claims priority, application Germany Feb. 3, 1960
17 Claims. (Cl. 88—1.5)

This invention relates to photographic cameras provided with built-in viewfinders and having at least one other indicating instrument, such as an exposure meter, built thereinto. More particularly, the invention is directed to cameras of this type including means for providing, in or immediately adjacent the normal field of view of the viewfinder, an image, at substantially infinity, of the indication of such other instrument. Insofar as common features are concerned, this application is a continuation-in-part of my copending application Serial No. 813,101, filed May 14, 1959, for "Camera Provided With Built-In Viewfinder and Exposure Meter," now Patent No. 2,994,257, issued August 1, 1961.

The above-identified application discloses a block-type Albada finder in which the light rays from the indicator of a measuring instrument, located outside the viewfinder, are guided into the intermediate block of the viewfinder and, by optical means including a mirror mounted in the intermediate block at an angle to the optical axis of the viewfinder, are directed toward the eyepiece end of the viewfinder to provide, in the field of view of an observer and at substantially infinity, an image of the indication of the indicating means. The optical means in this prior application may include a collimating lens disposed outside the viewfinder proper in the path of light rays from the measuring instrument, or additional mirror or reflecting means within the viewfinder effective on the light rays from the measuring instrument, all for the purpose of providing an image of the position of the indicator or pointer of the measuring instrument at substantially infinity adjacent the eyepiece end of the viewfinder.

The block type Albada viewfinder used in the prior application includes a front optical member having a concave inner surface cemented or the like to the convex outer end of an intermediate block, and an eyepiece or rear optical member having a convex surface which is cemented or otherwise united with a concave inner end surface of the intermediate block, the partially permeable light reflecting mirror of the Albada type finder being positioned at the interface between the front member and the intermediate block, and the picture limiting frame being positioned at the interface of the rear optical member and the intermediate block.

The present invention utilizes the same principle as the invention of the prior application. In the present invention there is provided, within the body of the Albada finder and in the path of rays reflected by the oblique mirror directly to the eyepiece, optical means having a refractive power such that the image of the indicating means lies substantially in the focal plane thereof. With this type of arrangement, there is made possible a particularly simple design of the viewfinder and one which has several advantages from the manufacturing standpoint. Among the advantages is that the image of the indicator can be provided on a reduced scale. Another advantage is the elimination of the collimator lens of the prior arrangement, with the function of the collimator lens being performed by the plano-convex lens at the eyepiece of the viewfinder.

For an understanding of the principles of the invention, reference is made to the following description of typical embodiments thereof as illustrated in the accompanying drawings. In the drawings:

FIGS. 5 and 6 illustrate modifications of the embodiment of the invention shown in FIG. 4;

FIG. 7 illustrates a modification of the invention, similar to that shown in FIGS. 4, 5 and 6, but wherein the recess is provided in the intermediate body of the viewfinder in spaced relation to the inner surface of the eyepiece;

Figure 1:
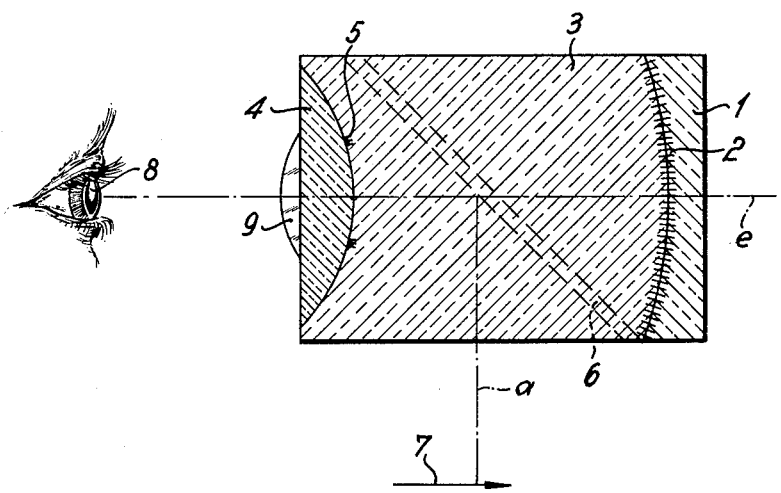
FIG. 1 is a somewhat schematic longitudinal sectional view of a block type Albada finder incorporating one embodiment of the invention, the view being taken essentially on the line I—I of FIG. 2.
Figure 2:
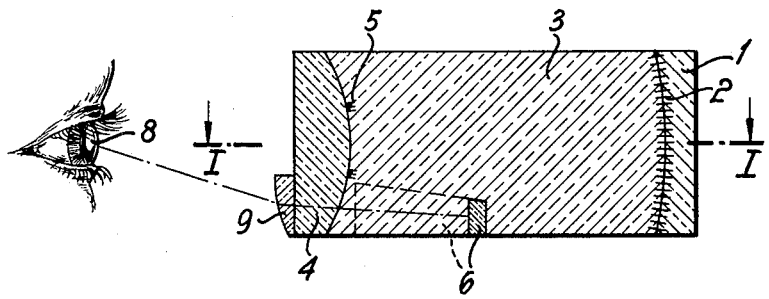
FIG. 2 is a view similar to FIG. 1, but taken at substantially right angles thereto.

Referring first to FIGS. 1 and 2, the block type Albada viewfinder illustrated therein is shown as comprising a plano-concave front optical element 1 which is substantially rectangular in form, element 1 having a plane outer surface and a concave inner surface. The concave inner surface of front element 1 is cemented to the convex outer surface of an intermediate block or body member 3 of suitable transparent material, and the usual partially light permeable or partly transparent mirror 2 is arranged at the interface between the inner surface of front optical element 1 and the outer end of member 3. Member 3 has an essentially concave inner surface, and the rear optical element, or eyepiece or ocular 4, is a plano-convex lens having its convex surface cemented to the concave inner end surface of member 3, with its plane outer surface facing the eye 8 of a viewer. The picture limiting frame 5, which lies in the focal plane of the mirror 2 and at substantially infinity, is positioned at the interface between the inner surface of eyepiece 4 and the inner end surface of member 3.

Member 3 is formed with a slot extending obliquely relative to the optical axis $e$ of the viewfinder, and in this slot there is positioned a mirror 6 whose mirrored surface faces the eyepiece 4 and also faces laterally of the viewfinder. The indicator 7 of a suitable measuring instrument mounted in the camera but positioned outside the viewfinder is arranged to have light rays, imaging its indicating position, strike mirror 6 as indicated by the ray $a$. Mirror 6 reflects the rays striking the mirror along the optical axis $e$ and through the lens 9 to the eye 8 of an observer. Lens 9 is a small lens having a convex exposed surface and having its inner surface cemented to the outer surface of the eyepiece 4, and is so dimensioned that the image of indicator 7 lies in its focal plane. Consequently, to one looking through the viewfinder along the optical axis $e$, the image of indicator 7 appears at substantially infinity.

The lens 9 is preferably devised as a narrow and more or less rectangular strip, as will be best seen from FIG. 2. Its position relative to the optical axis 9 is determined by the image angles which it is necessary to maintain for proper provision of an image of the position of indicator 7. In the usual case, lens 9 will have the general shape of a wedge in end elevation, and so is positioned that the angle of the wedge opens toward the optical axis e.

Figure 3:
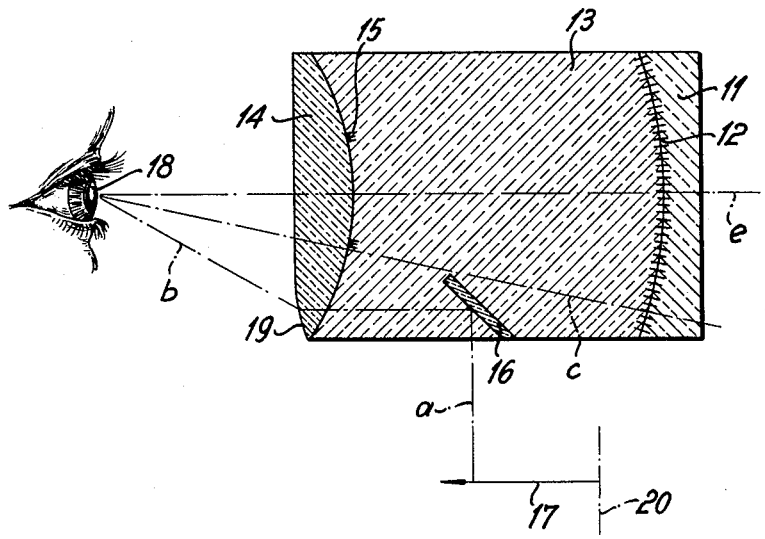
FIG. 3 is a view similar to FIG. 1 but illustrating a modification of the invention involving the provision of a special optical curvature on the outer surface of the eyepiece of the viewfinder.

In the embodiment of FIG. 3, parts of the viewfinder corresponding to the parts 1 through 7, of FIGS. 1 and 2 are designated 11 through 17, respectively, and the eye of the viewfinder, denoted 8 in the embodiment of FIGS. 1 and 2, is denoted 18 in the embodiment of FIG. 3. Referring to this latter figure, the mirror 16, instead of being mounted to reflect rays entering through the bottom surface of the intermediate part of the block shaped finder, as is the mirror 6 of FIGS. 1 and 2, is mounted to have directed thereon rays entering a side face of the intermediate block or body 13 of the viewfinder. Furthermore, mirror 16 is positioned outside the solid angle of the line of sight of one looking through the viewfinder along the optical axis e, the limits of this solid angle being indicated by the rays c. The indicator 17, in this instance, is mounted to rotate about a horizontal axis 20, and the light rays from the indicator 17, as indicated by ray a, strike the reflecting surface of mirror 16 and are reflected through the portion 19 of eyepiece 14 and into the eye as indicated by the ray b. The portion 19 of the eye facing surface of ocular 14 is given a special curvature in this case, whereby the image of the position of indicator 17 appears to be at infinity as viewed by the eye 18. Furthermore, the image of indicator 17 is not in the normal field of view of the finder but is laterally closely adjacent thereto.

Figure 4:
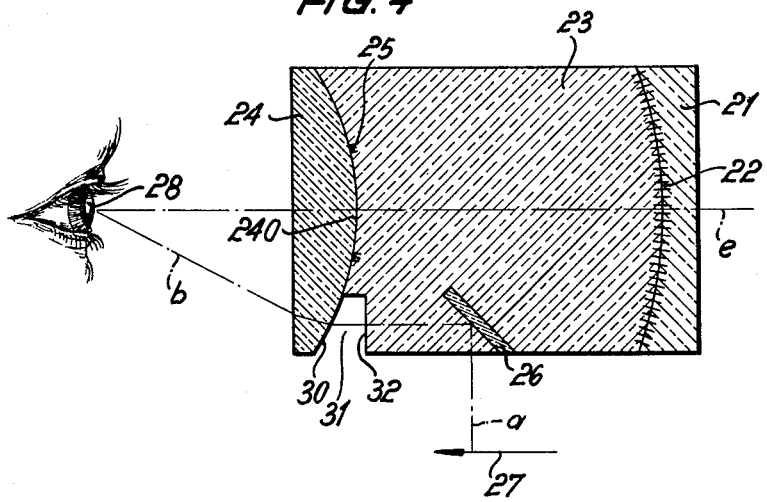
FIG. 4 is a view similar to FIG. 1 in which a lateral recess is provided adjacent the inner surface of the eyepiece of the viewfinder, with the eyepiece acting as the optical means.

In the embodiment of the invention shown in FIG. 4, parts similar either in function or construction to the parts 1 through 8 of FIGS. 1 and 2, or to the parts 11 through 18 of FIG. 3, are designated by the reference characters 21 through 28, respectively. A mirror 26 is cemented into the intermediate or central block 23 in essentially the same manner as the mirror 16 is cemented into the central block 13 of FIG. 13.

In accordance with this embodiment of the invention, a part 30 of the convex surface of the ocular or rear optical element 24 is not cemented to the intermediate block 23, and the latter is formed with a notch or gap 31 opening through its side and inner end, and defined by a plane surface 32 which lies in a plane perpendicular to the optical axis e of the viewfinder. The position of plane surface 32 and the dimensions of the recess 31 are not critical with respect to the viewfinder, since the recess or notch 31 and the plane surface 32 lie outside the normal field of view of one looking through the viewfinder. However, the position of the plane surface 32 is so selected, in each instance, as to provide the best effects for the particular instance and so as not to disturb or affect the normal functioning of the viewfinder. The light ray a, for forming the image of the position of the indicator 27, enters laterally through the intermediate block 23 and is reflected by mirror 26 as a ray b which exits through the plane surface 32, enters the convex surface 30, and is directed to the eye 28. The curvature of the convex surface 240 of the ocular 24 is so selected that the exposed surface part 30 provides a lens having a focal length such that the image of the indicator 27 appears to be at substantially infinity.

Under certain circumstances, the optical conditions may be such that the curvature of the convex surface 240 does not conform to the desired curvature of the lens section 30 effective to provide an image, at substantially infinity, of the position of the indicator 27. For example, such circumstances may arise due to a particular location or positioning of an exposure meter indicator within the camera casing, or due to the desired shape of the Albada viewfinder by virtue of special positioning or spatial arrangement. In a particular example, the requirements for providing proper illumination of the frame 25 may make it necessary for the curvature of the surface 240 to be greater than would be required for the proper lens design of the portion 30 of this surface. Particular arrangements for accommodating the special situations are incorporated in the embodiments now to be described.

In the embodiment of FIG. 5, parts corresponding to the parts 21 through 28 of FIG. 4 are designated, respectively, by reference characters 41 through 48, the convex surface 240 is designated 440, and the parts of FIG. 4 designated by references 30 through 32 are designated, in FIG. 5, by references 50 through 52. In this embodiment of the invention, a lens 53 is provided with a concave surface which is cemented to the exposed convex surface 50, lens 53 being mounted within the notch or gap 51 and having an essentially convex exposed surface facing the plane surface 52. The curvature of the convex surface of lens 50 facing the plane surface 52 differs from the curvature of the convex surface 440 of the eyepiece or ocular 44. With this arrangement, it is possible to obtain the optimum optical characteristics compatible with the structural and physical circumstances, both pertinent to the frame mounting function of the viewfinder as well as the function of the viewfinder in providing an image of the extraneously located measuring indicator.

The principles of the present invention are applicable fully to Albada viewfinders wherein, in a known manner, the picture limiting frame is supported on a plane bearing surface instead of on a spherically convex bearing surface as shown in the drawings. In such instance, in the embodiment of FIG. 4 it would then be necessary to provide a curvature 30 on the plane outer surface of the rear optical element 24, to provide the proper optical characteristics for forming the image of the indicator, and similar to the curved surface 19 of FIG. 3. Depending on the specific optical conditions, the curvature ground on the plane surface of the rear optical element cemented to block 43 could be either concave or spherically convex. Also, in the case of an arcuate or curved frame supporting interface, such as shown in FIG. 4, a concave surface portion could be ground on the convex surface of the member 24, the surface 30 facing the plane surface 32 being convex.

FIG. 6 illustrates an embodiment which is generally similar to that of FIG. 5. In this embodiment, the parts designated by the reference characters 41 through 48 of FIG. 5 are designated by the reference characters 61 through 68, the convex surface 440 of FIG. 5 is designated 640 in FIG. 6, the recess 51 of FIG. 5 is designated 71 in FIG. 6, the convex surface 50 of FIG. 5 is designated 70 in FIG. 6, and the plane surface 52 of FIG. 5 is designated 72 in FIG. 6. In the embodiment of FIG. 6, a lens 74 is provided having a plane surface cemented to the plane surface 72 and a concave surface which faces the exposed portion 70 of the convex surface 640 of the ocular 64. Again, the additional lens 74 in conjunction with the convex exposed surface 70, forms the optical means for providing, at substantially infinity, an image of the extraneously positioned indicator.

In the arrangement of FIG. 7, the parts of the Albada viewfinder corresponding to the parts 1 through 8 of FIGS. 1 and 2 have been designated 81 through 88, respectively. In this embodiment of the invention, the notch or recess 91 of FIGS. 4, 5 and 6 is spaced outwardly from the convex surface of the ocular 84. Such spacing may be the distance of one segment, or an amount of a few millimeters, from the surface 840. The collimator effect for providing, at substantially infinity, the image of the laterally disposed indicator is effected by the two lenses 93 and 94. Each of these lenses has a plane face which is cemented to a plane surface 90 or 92 of the notch 91, the plane surfaces 90 and 92 lying in planes which are perpendicular to the optical axis of the viewfinder. Lenses 93 and 94 have facing convexly curved surfaces whose curvature is so selected as to direction and degree as to bring about the desired formation of the image of the indicator at substantially infinity, by means of the light rays reflected by the oblique mirror 86 through these lenses and to the eye 88. The advantages of the arrangement shown in FIG. 7 are that curvature of the convex surface 840 of the ocular 84 can be selected as desired to suit the particular requirements of the viewfinder, and that the ocular 84 may be cemented to the intermediate block 83 without there being any difficulties due to milling or providing a clearance between the concave inner surface of the block 83 and the convex surface 840 of the ocular 84.

The lenses 93 and 94 may have either identical or diverse refractive indices. Thus, one of the two lenses may be provided with an infinite radius and to be optically ineffective. Furthermore, lenses 93 and 94 may be made of plastic composition material and cemented to a glass block 83, using either the same plastic material or another transparent adhesive.

A special method of providing the lenses 93 and 94 is that of polymerizing, with the aid of a plaster mold and using epoxy or ethoxylin resin as a base material, the lenses 93 and 94 in the milled slot 91 of the intermediate block 94, the adherence of the lenses 93 and/or to the surfaces of the slot 91 being effected simultaneously with their molding. This is feasible not only when the intermediate block 83 is made of glass but also when the latter is made of a transparent plastic. In the latter instance, the lenses may be pressed into position immediately after their formation and thus require no special cementing into position. Also, the slot for receiving the mirror 86 can be formed during the molding of the intermediate block 83, both in this instance and in the embodiments of the invention described elsewhere in this specification.

Figure 8:
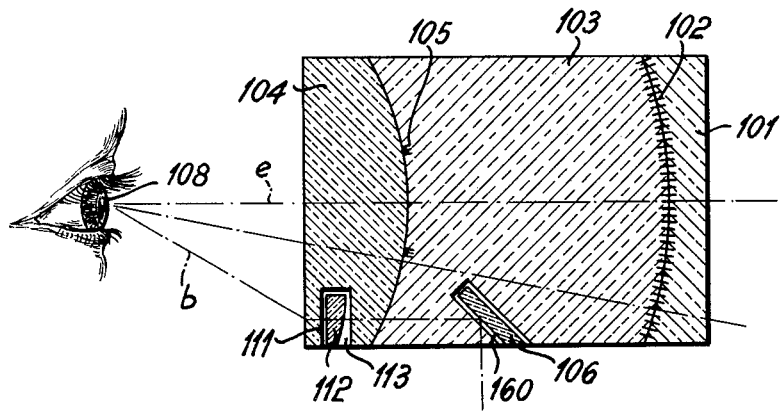
FIG. 8 is a view similar to FIG. 1 illustrating an embodiment of the invention in which a high refractory lens is embedded in the eyepiece of the viewfinder.

In accordance with the invention, the necessary positive refractive power for providing, at substantially infinity, an image of the indicator may be obtained by fully embedding a lens of high refractive index glass within the body of the finder. An arrangement of this type is shown in FIG. 8. In this figure, the viewfinder parts 1 through 8 of FIGS. 1 and 2 are designated 101 through 108.

The oblique mirror 106 is embedded within an oblique slot in the intermediate bottle 103 with the aid of a layer 160 of optical cement, as in the examples previously mentioned. A slot 111, which is defined by plane surfaces which are substantially perpendicular to the optical axis e of the viewfinder, is formed in the ocular 104 to open through a lateral edge thereof. This slot can be formed in any suitable manner, as by sawing, drilling, milling, or by being pressed into the rough lens casting. A lens 112 is embedded in the slot 111 using a layer of cement 113. The cement 113 preferably has the same index of refraction as the material of rear optical element 104, while the lens 112 has a higher index of refraction. If the element 104 has an index of refraction of 1.52, for example, the index of refraction of lens 112 should not be less than 1.55, whereas the index of refraction of the cement layer 113 should be 1.52, the same as that of the ocular 104.

The optical characteristics of this embodiment of the invention are essentially the same as those of the embodiments previously described. The advantage of the arrangement of FIG. 8 is the elimination of glass-air interfaces, which prevents the occurrence of disturbing refraction, collection of dust, precipitation of moisture, etc. on exposed surfaces.

Figure 9:
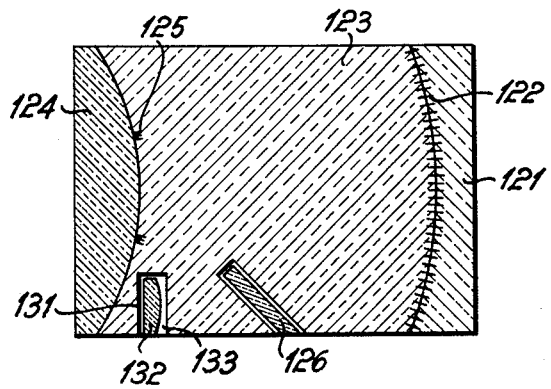
FIG. 9 is a view similar to FIG. 1 but illustrating the arrangement of FIG. 8 with the high refractory lens embedded in the intermediate block of the viewfinder.

FIG. 9 shows an embodiment of the invention which is an alternative to that shown in FIG. 8. In this embodiment of FIG. 9, a slot 131 is formed in the intermediate body 123 adjacent but spaced from the convex surface of the ocular 124, and a lens 132 is embedded in the slot 131 with the aid of a layer 133 of optical cement. In this case, the lens 132 has a substantially plane surface facing the element 124, and a convex surface facing the mirror 126. The same is true of the lens 112 of FIG. 8, but the convex surface of the lens 112 differs somewhat from that of the lens 132 in that the lens more nearly approximates a wedge shape.

It should be understood that it is of no pertinency to the principles of the invention whether some or all of the members of the Albada viewfinder are made of glass or of transparent plastic, and, in the foregoing description, where specific mention is made of glass, it should be understood that the material employed may also be a transparent plastic material.

While specific embodiments of the invention have been shown and described in detail to illustrate the application of the principles of the invention, it should be understood that the invention may be embodied otherwise without departing from such principles.

What is claimed is:

1. In a photographic camera including a built-in measuring instrument having an indicator pointer, a built-in block type Albada viewfinder including a front optical element having a concave inner surface, a rear optical element having an inner surface facing said concave surface, an intermediate optical block member having end surfaces substantially conforming and cemented to said concave surface and said inner surface of said rear optical element, partially light permeable mirror means disposed in the interface between said front optical element and said block member, a picture limiting frame disposed in the interface between said rear optical element and said block member in substantially the focal plane of said partially permeable mirror means for reflection by the latter at substantially infinity, and a mirror mounted within said block member and lying in a plane oblique to the optical axis of said Albada viewfinder for reflecting light rays, entering laterally through said block member from said pointer, directly through said rear optical element to the eye of an observer utilizing the viewfinder: an improved arrangement for providing, in the field of view of said viewfinder at substantially infinity, an image of said pointer, said arrangement comprising a recess in a lateral surface of said finder block and intersecting the path of light rays reflected by said mirror to the eye of an observer; and optical means integrated with the body of the viewfinder and having a surface positioned in said recess in the path of light rays reflected by said mirror through said rear element, said optical means having a refractive power such as to provide, in substantially its focal plane, an image of said indicator pointer.

2. The improved arrangement in photographic cameras, as claimed in claim 1, in which the outer surface of said rear optical element is substantially plane, and said optical means comprises a convex surface on said rear optical member and in the path of rays reflected by said oblique mirror through said rear optical element.

3. The improved arrangement in a photographic camera, as claimed in claim 1, in which the end surface of said intermediate block member joined to the inner surface of said rear optical element is formed with said recess extending laterally into said block member and which exposes a portion of the inner surface of said rear optical element; the exposed portion of the inner surface of said rear optical element being in the path of rays reflected by said oblique mirror through said rear optical element and having a spherical curvature positioned and proportioned such that the image of the indicator pointer lies substantially in the focal plane thereof; the exposed portion of the inner surface of said rear optical element constituting said optical means.

4. The improved arrangement for photographic cameras, as claimed in claim 3, in which the surface of said recess in said block member facing the exposed portion of the inner surface of said rear optical element is disposed in a plane perpendicular to the optical axis of the viewfinder.

5. The improved arrangement in a photographic camera, as claimed in claim 3, in which the inner surface of the rear optical element is convex throughout its extent and the exposed portion thereof constitutes a portion of said inner surface having the same curvature as the remainder of said inner surface.

6. The improved arrangement for photographic cameras, as claimed in claim 5, in which the surface of said recess in said block member facing the exposed portion of the inner surface of said rear optical element is disposed in a plane perpendicular to the optical axis of the viewfinder.

7. The improved arrangement in photographic cameras, as claimed in claim 1, in which said block member is formed with a laterally opening notch opening into its end surface cemented to the inner surface of said rear optical element and constituting said recess, to expose a portion of the inner surface of said rear optical element; said optical means comprising a lens cemented to the exposed portion of the inner surface of said rear optical element and having an exposed surface facing toward said front optical element, said lens being disposed in the path of rays reflected by said mirror through said rear optical element; the curvature of said lens being selected such that the image of said indicator pointer is formed substantially in the focal plane of said lens.

8. The improved arrangement in photographic cameras, as claimed in claim 7, in which the surface of said recess facing the exposed surface of said lens lies in a plane perpendicular to the optical axis of the viewfinder.

9. The improved arrangement in photographic cameras, as claimed in claim 7, in which the exposed portion of the inner surface of said rear optical element has a convex curvature; said lens having a concave surface cemented to said inner surface.

10. The improved arrangement in photographic cameras, as claimed in claim 9, in which the exposed surface of said lens is convex.

11. The improved arrangement in photographic cameras, as claimed in claim 10, in which the curvature of the exposed convex surface of said lens differs from the curvature of the concave surface thereof; the curvature of the concave surface of said lens corresponding to the overall curvature of the inner surface of said rear optical element.

12. The improved arrangement in photographic cameras, as claimed in claim 1, in which said intermediate block member is formed with said recess opening laterally thereof and through the end surface thereof cemented to the inner surface of said rear optical element, to expose a portion of the inner surface of said rear optical element; the surface of said recess facing the exposed portion of the inner surface of said rear optical element lying in a plane which is perpendicular to the optical axis of the viewfinder; said optical means comprising a lens cemented to such facing surface of said recess and having a concave surface facing the exposed portion of the inner surface of said rear optical element; the curvature of said lens being so proportioned that the image of said indicator pointer is provided at substantially the focal plane of said lens; said lens being positioned in the path of rays reflected by said oblique mirror through said rear optical element.

13. The improved arrangement in photographic cameras, as claimed in claim 1, in which said intermediate block member is formed with said recess opening laterally therethrough between said oblique mirror and its end surface secured to the inner surface of said rear optical element; said recess having laterally extending facing surfaces in planes which are perpendicular to the optical axis of the viewfinder; said optical means comprising a pair of lenses each secured to one of the facing surfaces of said recess, and said lenses having convex surfaces facing each other; said lenses lying in the path of rays reflected by said oblique mirror through said rear optical element and having curvatures such that the image of said indicator pointer lies substantially in the focal plane of said optical means.

14. The improved arrangement in photographic cameras, as claimed in claim 13, in which said lenses are molded in position of a polymerized adhesive plastic material.

15. The improved arrangement in photographic cameras, as claimed in claim 1, in which said rear optical element is formed with said laterally opening recess in one edge; said optical means comprising a lens cemented into said recess and having a refractive index higher than that of said rear optical element and effective to provide, in its focal plane, an image of said indicator pointer; said lens being disposed in the path of rays reflected by said oblique mirror through said rear optical element.

16. The improved arrangement in photographic cameras, as claimed in claim 15, in which the cement holding said lens in position has a refractive index substantially equal to that of said rear optical element.

17. The improved arrangement in photographic cameras, as claimed in claim 1, in which said intermediate block member is formed with said recess opening through one lateral surface thereof; said optical means comprising a lens of material having a high index of refraction, cemented in said recess and lying in the path of rays reflected by said oblique mirror through said rear optical element; said lens providing, in substantially its focal plane, the image of said indicator pointer.

References Cited in the file of this patent

UNITED STATES PATENTS

| 2,346,076 | Mihalyi | Apr. 4, 1944 |
| 2,959,092 | Faulhaber | Nov. 8, 1960 |
| 2,983,208 | Sapp | May 9, 1961 |
| 2,994,257 | Papke | Aug. 1, 1961 |

FOREIGN PATENTS

| 523,662 | Great Britain | July 19, 1940 |
| 547,045 | Great Britain | Aug. 11, 1942 |
| 547,192 | Germany | Mar. 24, 1932 |